E. D. LARAWAY & F. C. ROCKWELL,

Said LARAWAY assignor of one-half to J. COOLIDGE-HILLS.

COMBINED BOX AND TRAY MOLDED FROM PULP.

No. 10,132. Reissued June 6, 1882.

Witnesses
N. E. Olifhant,
John C. Kilby,

Inventors
Elbert D. Laraway
Fred C. Rockwell.
per Chas. H. Fowler
Attorney.

N. PETERS, Photo-Lithographer, Washington, D. C.

UNITED STATES PATENT OFFICE.

ELBERT D. LARAWAY AND FRED C. ROCKWELL, OF HARTFORD, CONNECTICUT; SAID LARAWAY ASSIGNOR OF ONE-HALF HIS RIGHT TO J. COOLIDGE HILLS, OF SAME PLACE.

COMBINED BOX AND TRAY MOLDED FROM PULP.

SPECIFICATION forming part of Reissued Letters Patent No. 10,132, dated June 6, 1882.

Original No. 240,595, dated April 26, 1881. Application for reissue filed October 21, 1881.

*To all whom it may concern:*

Be it known that we, ELBERT D. LARAWAY and FRED C. ROCKWELL, citizens of the United States, residing at Hartford, in the county of Hartford and State of Connecticut, have invented certain new and useful Improvements in Combined Box and Tray Molded from Pulp; and we do hereby declare that the following is a full, clear, and exact description of the same, reference being had to the accompanying drawings, in which—

Figure 1:
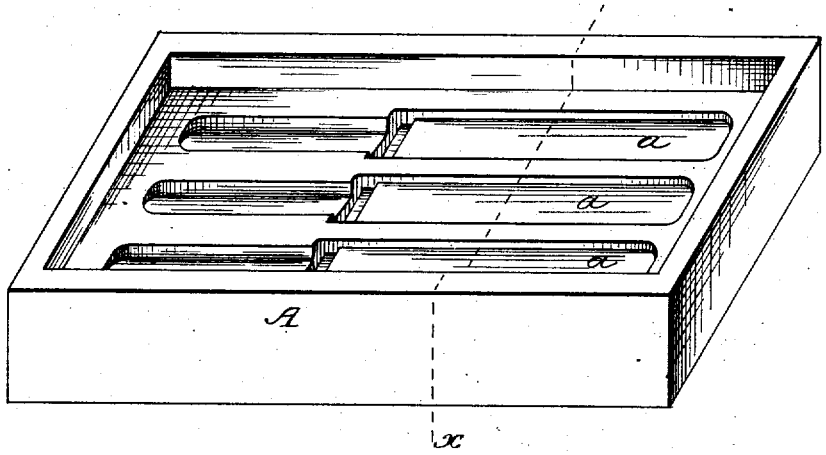
Figure 2:
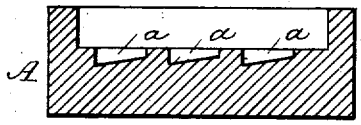
Figure 3:
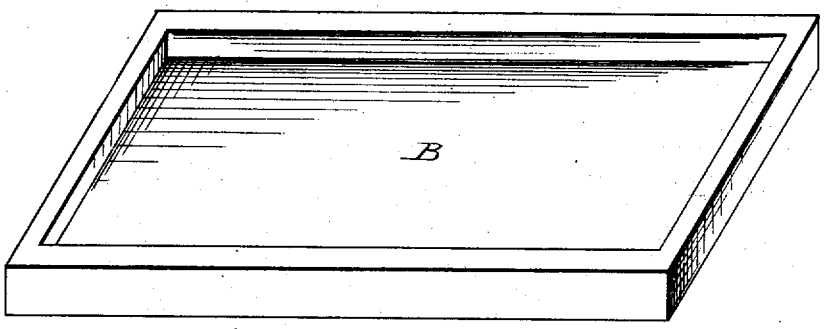

Figure 1 is a perspective view of our invention with the cover removed. Fig. 2 is a cross-section taken on line *x x* of Fig. 1, and Fig. 3 is a perspective view of the cover.

This invention refers to that class of boxes or receptacles adapted for holding, transporting, and displaying goods, such as articles of jewelry, silver-ware, &c.

Heretofore it has been common to make such boxes or receptacles of wood, from several pieces, and to fasten them together, the interior thereof being lined or covered with velvet, silk, or other similar material to prevent the grain of the wood from marring or otherwise injuring the polished surface of the article or articles, especially while *in transitu.* The above-described manner of constructing these boxes or receptacles renders them not only very expensive, but the essential features of strength and durability, in connection with lightness in weight, which are important in their production, were not obtained.

The main object of our invention is to remove the above-mentioned difficulties by rendering these boxes or receptacles both light and durable and capable of being manufactured at a greatly-reduced cost.

The invention therefore consists in a box or receptacle molded in one piece from pulp, having sockets or depressions in its bottom in shape to conform to the shape of the articles of table-cutlery placed therein, substantially as shown in the drawings, hereinafter described, and claimed.

In the accompanying drawings, A represents the box or receptacle, the interior or bottom of which has depressions or sockets *a* of the required shape to adapt them for the reception and display of articles of table-cutlery—such as knives and the like; also their transportation. The bottom, or that portion of the box A having the depressions or sockets *a*, has usually been termed a "tray," and it has been the custom to make it of wood and afterward cover it on its face with velvet and then secure or fasten it in the box. The box or receptacle A with this tray are formed together of pulp molded to shape. Thus the warping of both tray and box or receptacle incident to the construction in wood is avoided. The expense of the cutting to form the sockets or depressions *a* in the tray or bottom of the box or receptacle is not required, and the textile covering of the tray is rendered unnecessary. The entire structure can be made lighter, as the tray itself forms the bottom of the box or receptacle, thereby rendering the latter cheaper of production and much more convenient for use, especially when employed as a packing-box for the transportation of the articles to the purchaser previous to being placed on exhibition. The box when thus used is provided with a suitable flanged cover, B, as shown in Fig. 3, which is also molded from pulp in the same manner as the box or receptacle A.

The sockets or depressions *a*, as will be seen, are of such form as to adapt them for the reception of articles of table-cutlery—such as knives—and therefore the contour or outline of the sockets or depressions are of irregular shape and vary in depth throughout their length to conform to the contour or outline of the article of table-cutlery and the irregular shape thereof, as well as its varying thickness throughout its length.

Having now fully described our invention, what we claim as new, and desire to secure by Letters Patent, is—

1. A box or receptacle molded in one piece from pulp with sockets or depressions in its bottom, the contour or outline thereof being of irregular shape and varying in depth throughout their length to conform to the shape and varying thickness of the article of table-cutlery placed therein, substantially as and for the purpose set forth.

2. A box or receptacle molded from pulp having on its bottom sockets or depressions of the form substantially as shown, for adapting them to receive and hold articles of table-cutlery, in combination with a flanged cover, also molded from pulp, and disconnected or independent of said box or receptacle, substantially as and for the purpose specified.

In testimony whereof we affix our signatures in presence of two witnesses.

ELBERT D. LARAWAY.
FRED C. ROCKWELL.

Witnesses:
THOMAS B. CHAPMAN,
CHAS. P. WATSON.